(12) United States Patent
Meisberger et al.

(10) Patent No.: US 9,409,187 B2
(45) Date of Patent: Aug. 9, 2016

(54) CENTRIFUGE DEVICE INCLUDING AN ACTUATING ELEMENT AND METHOD FOR OPERATING SAME

(71) Applicant: Fresenius Kabi Deutschland GmbH, Bad Homburg (DE)

(72) Inventors: Artur Meisberger, St. Wendel (DE); Ilka Sternheimer, Frankfurt (DE)

(73) Assignee: FRESENIUS KABI DEUTSCHLAND GMBH, Bad Homburg (DE)

( * ) Notice: Subject to any disclaimer, the term of this patent is extended or adjusted under 35 U.S.C. 154(b) by 0 days.

(21) Appl. No.: 14/421,543

(22) PCT Filed: Aug. 14, 2013

(86) PCT No.: PCT/EP2013/066971
§ 371 (c)(1),
(2) Date: Feb. 13, 2015

(87) PCT Pub. No.: WO2014/027016
PCT Pub. Date: Feb. 20, 2014

(65) Prior Publication Data
US 2015/0231649 A1 Aug. 20, 2015

Related U.S. Application Data

(60) Provisional application No. 61/695,526, filed on Aug. 31, 2012.

(30) Foreign Application Priority Data

Aug. 14, 2012 (EP) .................................. 12180411

(51) Int. Cl.
*B04B 9/08* (2006.01)
*B01D 21/26* (2006.01)
*B04B 5/04* (2006.01)

(52) U.S. Cl.
CPC . *B04B 9/08* (2013.01); *B01D 21/26* (2013.01); *B04B 2005/0492* (2013.01); *B04B 2009/085* (2013.01)

(58) Field of Classification Search
CPC ................ B04B 9/08; B04B 2009/085; B04B 2005/0492
USPC ........... 494/17, 18, 21, 45, 83, 84; 210/380.1, 210/380.3, 781, 782; 138/111
See application file for complete search history.

(56) References Cited

U.S. PATENT DOCUMENTS 4,114,802 A * 9/1978 Brown .................. B04B 5/0442
174/86

(Continued)

FOREIGN PATENT DOCUMENTS

| DE | 3242541 | 5/1984 | |
|---|---|---|---|
| DE | 4220232 A1 * | 12/1993 | ............ B04B 5/0442 |

(Continued)

*Primary Examiner* — Charles Cooley
(74) *Attorney, Agent, or Firm* — Occhiuti & Rohlicek LLP (57) ABSTRACT

A centrifuge device comprises a fixed section, a drive device having a drive shaft, and a rotor mounted on the fixed section about a first rotational axis. The rotor is drivable about the first rotational axis. A transfer shaft is mounted on the rotor about a second rotational axis eccentric to the first rotational axis, the transfer shaft being coupled via a gearing with the fixed section. A centrifugal chamber is rotatable about a third rotational axis and is operatively connected to the transfer shaft. A locking device is arranged on the rotor for axially fixing the centrifugal chamber on the rotor. The locking device comprises a locking element and an actuating element, the locking element being adjustable between a locked position in which the centrifugal chamber is axially fixed with respect to the rotor and an unlocked position in which the centrifugal chamber is removable from the rotor.

13 Claims, 2 Drawing Sheets

(56) References Cited

U.S. PATENT DOCUMENTS

| | | |
|---|---|---|
| 4,163,519 A | 8/1979 | Stabile |
| 4,425,112 A * | 1/1984 | Ito .............................. B04B 5/00 494/18 |
| 4,950,401 A | 8/1990 | Unger et al. |
| 5,350,514 A * | 9/1994 | Witthaus ............... B04B 5/0442 210/360.1 |
| 5,558,769 A * | 9/1996 | Witthaus .................. B04B 9/08 210/360.1 |
| 2015/0231649 A1 * | 8/2015 | Meisberger ............... B04B 9/08 494/37 |

FOREIGN PATENT DOCUMENTS

| | | | |
|---|---|---|---|
| EP | 0575858 | 12/1993 | |
| EP | 0575858 A2 * | 12/1993 | ............ B04B 5/0442 |
| EP | 0642834 | 3/1995 | |
| EP | 0930099 | 7/1999 | |
| EP | 2698208 A1 * | 2/2014 | ............ B04B 5/0442 |

* cited by examiner

CENTRIFUGE DEVICE INCLUDING AN ACTUATING ELEMENT AND METHOD FOR OPERATING SAME

CROSS REFERENCE TO RELATED APPLICATIONS

This application is a National Stage of International Application No. PCT/EP2013/066971 filed on Aug. 14, 2013, which claims priority to European Application No. 12180411.6 filed on Aug. 14, 2012 and U.S. Provisional Application No. 61/695,526 filed on Aug. 31, 2012, the contents of which are hereby incorporated by reference in their entirety.

BACKGROUND

The invention relates to a centrifuge device and a method for operating a centrifuge device.

SUMMARY

A centrifuge device of this kind comprises a fixed section, for example a housing, and a drive device which comprises a drive shaft. On the fixed section a rotor is mounted rotatably about a first rotational axis, the rotor being drivable by means of the drive device about the first rotational axis. A transfer shaft is arranged on the rotor rotatably about a second rotational axis which is eccentrically with respect to the first rotational axis. The transfer shaft is coupled to the fixed section via a gearing such that the drive shaft is rotated about the second rotational axis relative to the rotor when the rotor is rotated. A centrifugal chamber is rotatable about a third rotational axis and is in operative connection with the drive shaft such that the centrifugal chamber is rotated when the transfer shaft is rotated. In addition, a locking device is provided which is arranged on the rotor and serves for axially fixing the centrifugal chamber on the rotor. The locking device comprises a locking element and an actuating element for adjusting the locking element. The locking element can be adjusted between a locked position in which the centrifugal chamber is axially fixed on the rotor and an unlocked position in which the centrifugal chamber can be removed from the rotor.

Such a centrifuge device in particular can implement a so-called continuous flow centrifuge without sliding seal which for example can be used for cell separation or as autotransfusion device. When used for example for autotransfusion during a surgical procedure, blood is sucked from a surgical location of a patient, is treated within the autotransfusion device and subsequently is fed back to the patient. A central component of such an autotransfusion device is the centrifugal chamber in which red blood cells are separated from other blood components and are washed using a physiologic salt solution in order to be fed back to the patient in a cleaned and concentrated shape. The treatment herein takes place continuously in that blood flows through the rotating centrifugal chamber and a concentrate of red blood cells is delivered into a re-transfusion bag.

In order to allow for a continuous flow through the centrifugal chamber it is, within such centrifuge devices, in general required that one or more tubes are guided to the centrifugal chamber in order to connect the centrifugal chamber with, for example, a pump bed. To prevent a twisting of the tubes when operating the centrifuge device due to the rotational movement of the centrifugal chamber, such centrifugal devices use the so-called 2-Omega principle (also called Adams' principle) according to which the tubes are moved to track the centrifugal chamber with half the rotational speed of the centrifugal chamber. This allows for a fixed connection of the tubes on the one hand, for example with a pump bed, and on the other hand with the centrifugal chamber without the tubes being twisted during operation of the centrifuge device.

The tubes, for example, can be guided on the rotor of the centrifuge device, wherein the rotor rotates with half the rotational speed of the centrifugal chamber and guides the tubes to track the centrifugal chamber.

Different drive concepts for driving the rotor and the centrifugal chamber have been suggested. Such drive concepts in general require a comparatively large structural space of the centrifuge device and are comparatively complicated in their structural built.

A conventional centrifuge device, known for example from DE 32 42 541 C2, uses a belt drive for transferring a rotational torque from a drive shaft to a centrifugal chamber.

In a centrifuge device known from EP 0 930 099 A2 a rotor with a centrifugal chamber arranged rotatably thereon is provided, the rotor transferring a rotational movement via coupling elements to the centrifugal chamber such that the centrifugal chamber during operation of the centrifuge device rotates with twice the rotational speed of the rotor. The coupling elements herein are constituted by conical gear wheels being mounted in a rotational fashion about horizontal rotational axes on the rotor, the conical gear wheels acting together on the one hand with a stator and on the other hand with the centrifugal chamber such that a transmission gearing for transmitting the rotational movement of the rotor to the centrifugal chamber is provided.

Within a centrifuge device known from EP 0 642 834 A2 a rotor is in operative connection with a drive device. A locking device is arranged on the rotor having an actuating element and a cam roller being coupled to the actuating element via an excenter. The cam roller, in a locked position, is in locking engagement with the centrifugal chamber and can, by adjusting the excenter, being moved with respect to the centrifugal chamber in order to bring the cam roller out of engagement with the centrifugal chamber.

In a centrifuge device known from U.S. Pat. No. 4,163,519, a centrifugal chamber is arranged on a rotor. The rotor carries two transfer shafts which on the one hand are coupled with a housing via a gearing, and on the other hand are in engagement with the centrifugal chamber. By rotating the rotor the transfer shaft is rotated and hence drives the centrifugal chamber to rotate with twice the rotational speed of the rotor.

Another centrifuge device in which a centrifugal chamber is arranged on a rotor and is driven by rotating the rotor is known from U.S. Pat. No. 4,950,401.

There is a desire for a centrifuge device which may have a simple structural built, requires little space and may use a comparatively small number of components.

It is an object of the instant invention to provide a centrifuge device and a method for operating a centrifuge device which allow for a compact structural built of the centrifuge device while at the same time using a small number of parts and having a comparatively simple structural built.

This object is achieved by means of a centrifuge device.

Accordingly, the drive device is operatively connected with the actuating element such that the drive device, when rotating the drive shaft in a first rotational direction about the first rotational axis, drives the rotor via the actuating element and, when rotating the drive shaft in a second rotational direction opposite to the first rotational direction, the actuating element is moved relative to the rotor.

The instant invention is based on the idea to provide a single drive device on the one hand for driving the rotor during normal operation of the centrifuge device and on the other hand for actuating the locking device. The drive device, for this, is in operational connection with the actuating element of the locking device, wherein, when turning the drive shaft in the first rotational direction, a driving force acts onto the rotor via the actuating element such that the rotor is forced to rotate for driving the centrifugal chamber. The drive device thus acts onto the actuating element for driving the rotor and moves the rotor when the drive shaft is rotated in the first rotational direction. If in contrast the drive shaft is moved in the second rotational direction opposite to the first rotational direction, the drive device acts onto the actuating element without carrying the rotor along. The actuating element in this way is adjusted in its position relative to the rotor such that the locking device is actuated and is transferred, for example, from its locked position into its unlocked position for removing the centrifugal chamber from the rotor.

Because only a single drive device for driving the centrifuge device is required, a construction with a reduced space requirement may result. Because the actuating of the locking device can be achieved by a simple reversal of the drive direction of the drive device, a complicated actuating mechanism for the locking device is not necessary.

Advantageously, the rotor rotates with a first rotational speed and the centrifugal chamber rotates with a second rotational speed which is twice the first rotational speed of the rotor. The rotor herein may guide one or more tubes for connecting the centrifugal chamber with external devices, for example a pump bed or liquid containers such as transfusion bags, such that the rotor moves the tubes arranged thereon with half the rotational speed of the centrifugal chamber, thus tracking the centrifugal chamber. This allows, according to the so-called 2-Omega principle (Adams' principle), a fixed connection of the tubes on the one side with the centrifugal chamber and on the other side with the external devices without the tubes being twisted during operation of the centrifuge device.

By means of the transfer shaft the rotational movement of the rotor is transmitted to the centrifugal chamber such that during operation of the centrifuge device the rotor and the centrifugal chamber are rotated by means of a single drive device. The transfer shaft for this may be an operative connection with a gear wheel of the centrifugal chamber, wherein the transfer shaft for example is coupled in a rotationally fixed manner with a drive wheel which for example via a toothing is in engagement with a toothing of the gear wheel of the centrifugal chamber.

The transfer shaft advantageously carries a coupling wheel which is coupled via the gearing with a fixed section of the centrifuge device. The gearing may for example be constituted as a belt gearing and may comprise a belt via which the coupling wheel is in operational connection with a gear wheel being arranged in a fixed manner on the fixed section of the centrifuge device.

Preferably, the belt is constituted as a toothed belt and is in toothed engagement with the coupling wheel and the gear wheel. The gear wheel, via which the belt is connected to the fixed section, e.g. a housing of the centrifuge device, preferably is arranged concentrically to the first rotational axis of the drive shaft and extends around the drive shaft, wherein the gear wheel preferably is located radially within the moving path of the transfer shaft arranged on the rotor such that the transfer shaft orbits around the gear wheel during operation of the centrifuge device.

By using a belt gearing, a simple, cheap, reliable coupling of the transfer shaft with the fixed section of the centrifuge device is provided. Via the gearing the transfer shaft is rotated relative to the rotor when the rotor is rotated, wherein the transmission of the rotational movement of the rotor into the rotational movement of the centrifugal chamber preferably has a transmission factor of 2:1, defined by the gearing coupling the transfer shaft with the fixed section and by the drive wheel coupling the transfer shaft with the centrifugal chamber.

Preferably the diameter of the drive wheel is chosen comparatively large which allows for a reduction of noise during operation of the centrifuge device. Because the drive wheel, via which the transfer shaft is coupled with a suitable gear wheel of the centrifugal chamber and which is constituted for example as a toothed wheel being in engagement with the gear wheel of the centrifugal chamber, comprises a comparatively large diameter, the noise generated due to the engagement of the gear wheel with the drive wheel is comparatively small.

Advantageously, the third rotational axis (of the centrifugal chamber) is concentrical to the first rotational axis (of the rotor). The centrifugal chamber and the rotor hence rotate about the same axis.

During operation of the centrifuge device the centrifugal chamber is axially fixed and is operatively connected via the transfer wheel with the rotor such that by driving the rotor by means of the drive device the centrifugal chamber is rotated. In order to fix the centrifugal chamber on the rotor, the locking device is provided which is arranged on the rotor and rotates together with the rotor when the rotor is rotated about the first rotational axis associated with the rotor. The locking device serves to fix the centrifugal chamber in the axial direction with respect to the third rotational axis associated with the centrifugal chamber such that the centrifugal chamber is axially held on the rotor and cannot axially move during operation of the centrifuge device.

The actuating element advantageously is arranged pivotably on the rotor about a fourth rotational axis and is coupled with a locking excenter connected to the locking element. The coupling herein is such that the locking element can be adjusted between the locked position and the unlocked position by pivoting the actuating element about the fourth rotational axis. The locking element can for example be constituted as a locking roller arranged rotatably on the locking excenter, the locking roller in the locked position being in locking engagement with the centrifuge chamber and in the unlocked position being out of engagement with the centrifugal chamber.

By driving the drive shaft in the second rotational direction, the actuating element can be moved relative to the rotor such that the locking excenter is pivoted and the locking element arranged on the locking excenter is transferred from the locked position into the unlocked position. The locking device, hence, is unlocked such that the centrifugal chamber can be removed from the rotor. If the centrifugal chamber again shall be locked, the drive device is driven in the first rotational direction such that the actuating element is moved relative to the rotor and the locking element is brought into locking engagement with the centrifugal chamber. Once the locked position is reached, the rotor is carried along and is rotated for driving the centrifugal chamber.

Because the locking element is constituted as a locking roller, the locking element can rotate, during operation of the centrifuge device, about the locking excenter in that the centrifugal chamber rolls along the locking element. The locking element being constituted as a locking roller may for example comprise a groove extending about the locking element into which, in the locked position, a protrusion of the centrifugal chamber extending about the third rotational axis of the centrifugal chamber lockingly engages such that the centrifugal chamber is axially held with respect to the rotor. For unlocking the locking device the locking element can be pivoted away from the centrifugal chamber such that the locking element no longer is in engagement with the centrifugal chamber and the centrifugal chamber is no longer axially fixed with respect to the rotor.

Preferably, the locking element comprises bi-stable positions in that it is held in the locked position and in the unlocked position of the locking device in a stable fashion. Upon moving the locking element into the locked position or into the unlocked position, the locking element remains in the position it has assumed. Because in particular the unlocked position is stable, it is not necessary to energize the drive device for holding the locking element in the unlocked position, which may make it possible to reduce the energy consumption of the centrifuge device. Only for actuating the locking device, but not for holding the locking device in its current position, an energization of the drive device is necessary.

In principle, it however is also conceivable to pretension the locking element for example by means of an elastic tensioning device towards one of its positions, for example towards the locked position, such that the locking device after an unlocking movement by itself is reverted into the locked position.

The locking device preferably comprises multiple locking elements, each for example constituted by locking rollers. For example, three locking elements can be provided which are arranged around the centrifugal chamber in an equally spaced manner about the rotational axis of the centrifugal chamber and which in the locked position of the locking device lockingly engage with the centrifugal chamber.

In this regard, it is conceivable that all of the locking elements are adjustable in their position for moving the locking device between the locked position and the unlocked position. In a specific embodiment, however, not all of the locking elements are adjustable but only one or a subset of the number of locking elements. If, for example, altogether three locking elements are provided, in one embodiment a single locking element is adjustable in its position, whereas the remaining locking elements are not adjustable and hence cannot be adjusted in their positions with respect to the centrifugal chamber.

By stating that one or multiple locking elements are not adjustable, it in the context of this text shall be meant that the position of the rotational axis of a locking element, if the locking element is constituted as a locking roller, cannot be adjusted relative to the rotor and hence is locationally fixed with respect to the rotor. Nevertheless, however, the locking element constituted as a locking roller can be rotated about its rotational axis with respect to the rotor.

If in contrast the locking element constituted as a locking roller can be adjusted in its position, the position of the rotational axis of the locking relative to the rotor can be varied such that the rotational axis, for example for unlocking the centrifugal chamber, can be displaced from the centrifugal chamber. The overall position of the locking roller hence is adjustable.

Preferably, in one embodiment, a braking device for braking the rotor during an adjustment movement of the actuating element relative to the rotor is provided. This braking device, constituted in particular by a magnetic brake for exerting a magnetic braking force onto the rotor, serves to hold the rotor in its current position when the locking device is unlocked such that the rotor is not carried along when moving the actuating element. The braking device serves also to hold the rotor in its current position during locking of the locking device from its unlocked position. Only after the locked position of the locking device is reached the rotor is carried along for driving the centrifugal chamber.

The object of the invention is also achieved by a method for operating a centrifuge device. The centrifuge device comprises a fixed section and a drive device having a drive shaft. A rotor is mounted rotatably about a first rotational axis on the fixed section and can be rotated by means of the drive device about the first rotational axis. A drive shaft is arranged on the rotor rotatably about a second rotational axis which is eccentric to the first rotational axis. The transfer shaft is coupled via a gearing with the fixed section such that the transfer shaft is rotated about the second rotational axis relative to the rotor during a rotational movement of the rotor. A centrifugal chamber being rotatable about a third rotational axis is operatively connected with the transfer shaft such that the centrifugal chamber is rotated during a rotational movement of the transfer shaft. A locking device arranged on the rotor for axially fixing the centrifugal chamber on the rotor comprises a locking element and an actuating element for actuating the locking element. The locking element can be adjusted between a locked position in which the centrifugal chamber is axially fixed with respect to the rotor and an unlocked position in which the centrifugal chamber can be removed. Herein it is provided that the drive device is operatively connected with the actuating element, wherein the drive device, when rotating the drive shaft in a first rotational direction about the first rotational axis, drives the rotor via the actuating element and, when rotating the drive shaft in a second rotational direction opposite to the first rotational direction, moves the actuating element relative to the rotor.

The advantages and advantageous embodiments described above for the centrifuge device in an analogous manner are also applicable for the method such that it shall be referred to the above.

BRIEF DESCRIPTION OF THE DRAWINGS

The idea underlying the invention shall subsequently be described in more detail according to the embodiments shown in the figures. Herein.

DESCRIPTION

Figure 1:
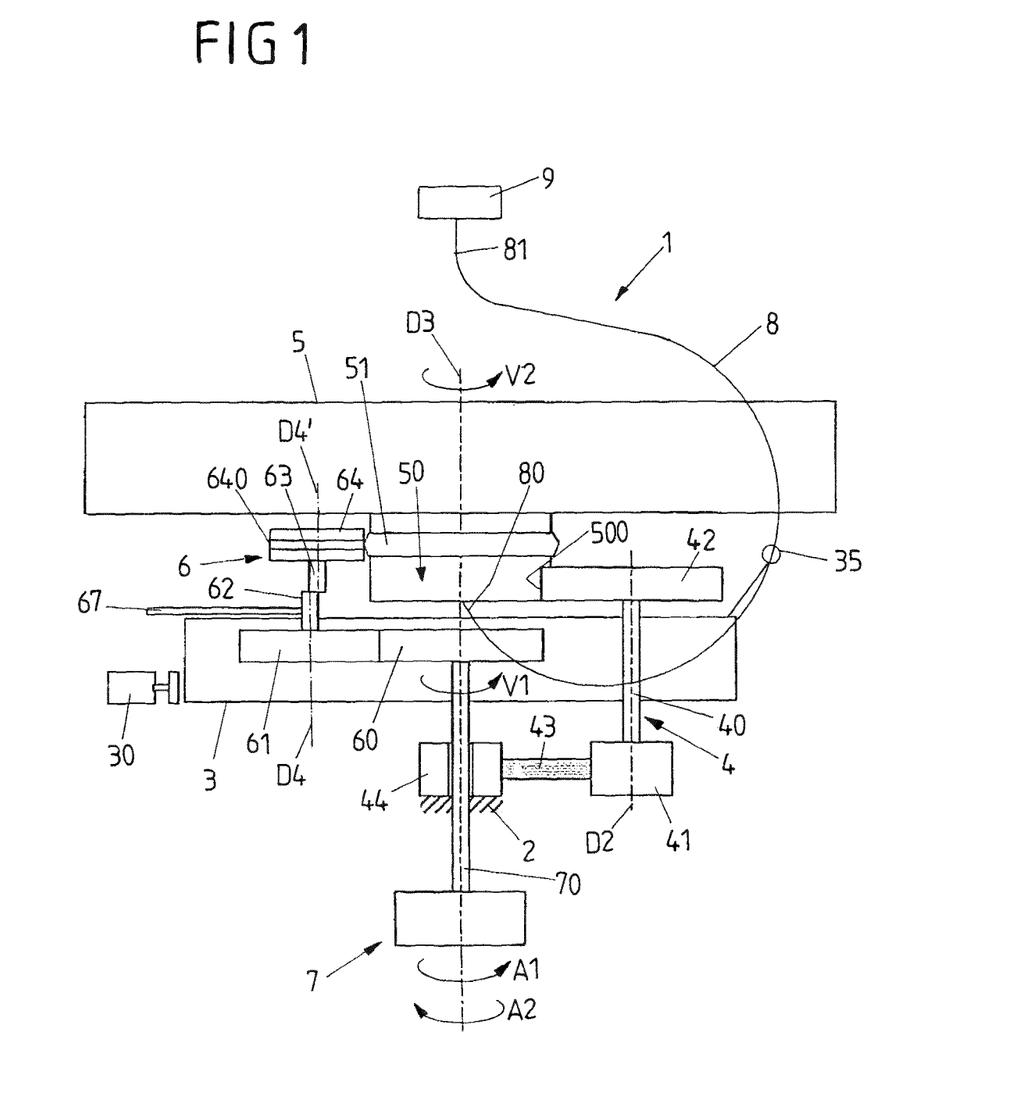
FIG. 1 shows a schematic sectional view through a centrifuge device comprising a rotor and a transfer shaft arranged thereon.
Figure 2:
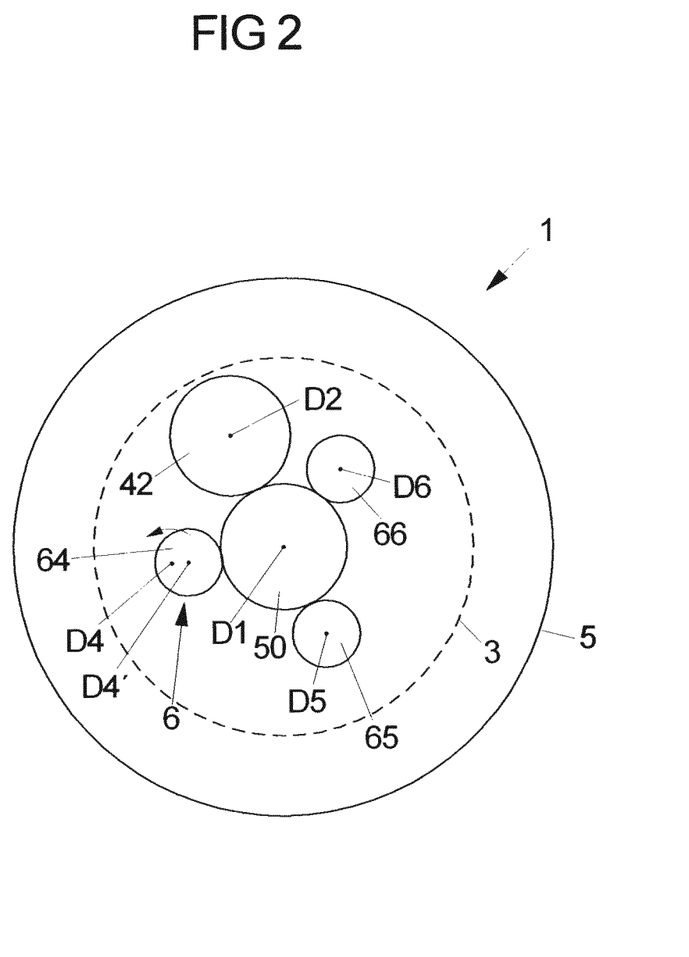
FIG. 2 shows a schematic top view of a centrifuge device.

FIG. 1 and FIG. 2 show, in different views, an embodiment of a centrifuge device 1 which comprises a rotatable rotor 3 and a rotatable centrifugal chamber 5.

The centrifuge device 1 is constituted in the fashion of a continuous flow centrifuge without sliding seal in which the centrifugal chamber 5 via a tube 8 is connected with a port 9 in order to provide a flow connection to external devices connected to the port 9, such as a pump bed or fluid containers, e.g. transfusion bags.

The tube 8 herein is via a first end 80 fixed on the centrifugal chamber 5 and via a second end 81 fixed on the port 9.

The tube 8 is guided on a guide device 35 of the rotor 3, wherein the rotor 3 during operation of the centrifuge device 1 rotates with a first rotational speed V1 which equals half the rotational speed V2 of the centrifugal chamber 5. The centrifuge device 1, in this way, implements the so-called 2-Omega principle (Adams' principle) according to which the guidance of the tube 8 on the rotor 3 prevents a twisting of the tube 8 during a rotation of the centrifugal chamber 5.

By means of the centrifugal chamber 5, fluids—in particular blood—can be treated in that particular components through centrifugation can be separated from other components. For example, in the context of autotransfusion a concentrate of red blood cells can be obtained which in a cleaned shape can be fed back to a patient.

The rotor 3 is mounted rotationally about a first rotational axis D1 which is concentric to the rotational axis D3 of the centrifugal chamber 5. A transfer shaft 40 is mounted rotatably on the rotor 3 about a rotational axis D2 which is eccentric, but extends in parallel to the rotational axis D1 of the rotor 3. The transfer shaft 40 is an integral part of a drive chain 4 for transferring a rotational movement from the rotor 3 to the centrifugal chamber 5.

On the transfer shaft 40 a coupling wheel 41 in the shape of a toothed wheel is arranged. The coupling wheel 41 is arranged on a side of the rotor 3 facing towards a drive device 7 and is coupled via a belt 43 in the shape of a toothed belt with a gearing wheel 44 fixedly arranged on a housing 2 of the centrifuge device 1. The belt 43 in the shape of the toothed belt on the one hand is in engagement with a toothing of the coupling wheel 41, and on the other hand with a toothing of a gearing wheel 44 such that the belt 43 during a rotational movement of the rotor 3 about the rotational axis D1 runs around the gearing wheel 44 and rolls along on the gearing wheel 44 in a substantially slippage-free manner such that the coupling wheel 41 and therewith the drive shaft 40 is rotated about the rotational axis D2 associated with the transfer shaft 40 relative to the rotor 3.

The rotational movement of the transfer shaft 40 during operation of the centrifuge device 1 hence is made up of two rotational components superimposed with each other. On the one hand, the drive shaft 40 rotates together with the rotor 3 about the rotational axis D1 of the rotor 3. On the other hand, the transfer shaft 40, via the gearing formed by the coupling wheel 41, the belt 43 and the gearing wheel 44, is rotated relative to the rotor 3 and hence carries out a rotational movement about the rotational axis D2 relative to the rotor 3 when the rotor 3 is rotated.

The transfer shaft 40 carries, on a side of the rotor 3 facing towards the centrifugal chamber 5, a drive wheel 42 which is formed as a toothed wheel and is in engagement with a gearing wheel 50 in the shape of a toothed wheel of the centrifugal chamber 5. The drive wheel 42 comprises an outer toothing 500 which engages into an associated toothing of the gearing wheel 50. Via the drive wheel 42, the rotational movement of the transfer shaft 40 is transferred to the centrifugal chamber 5, wherein the transmission of the drive chain 4 is designed such that the centrifugal chamber 5 during operation of the centrifuge device 1 rotates with a rotational speed V2 twice the rotational speed V1 of the rotor 3.

By coupling the transfer shaft 40 via a belt gearing with the housing 2, a transmission of the rotational speed V1 of the rotor 3 into the rotational speed V2 of the centrifugal chamber 5 is provided in a simple, cost-effective manner using only a single gearing stage. The constitution of the drive chain 4 herein makes it possible to use a drive wheel 42 with a comparatively large diameter which allows for a comparatively silent operation of the centrifuge device 1.

The drive device 7, for example constituted by an electric motor, via a drive shaft 70 is coupled with a gearing wheel 60 of a locking device 6 and transfers during normal operation of the centrifuge device 1 a torque via the gearing wheel 60 and an actuating element in the shape of an actuating wheel 61 to the rotor 3. The drive shaft 70 is mounted rotatably on the rotor 3 and is fixedly connected to the gearing wheel 60, which in turn is in toothed engagement with the actuating wheel 61.

The actuating wheel 61 is arranged on a shaft 62 which is mounted pivotably on the rotor 3 about a fourth rotational axis D4.

During normal operation of the centrifuge device 1, the drive shaft 70 is rotated in a rotational direction A1 about the rotational axis D1 such that the gearing wheel 60 is rotated accordingly. The gearing wheel 60 herein acts onto the actuating wheel 61 which carries the rotor 3 along and drives the rotor 3 to perform a rotational movement in the rotational direction A1 about the rotational axis D1. The rotational movement of the rotor 3 herein, as explained above, is transmitted via the drive chain 4 to the centrifugal chamber 5.

The locking device 6 is designed to axially lock the centrifugal chamber 5 via a locking element in the shape of a locking roller 64 coupled to a locking excenter 63. If the locking device 6 is in a locked position, the centrifugal chamber 5 cannot be axially moved along the associated rotational axis D3 relative to the rotor 3. The locking roller 64 is mounted rotatably about a rotational axis D4' on the associated locking excenter 63 and comprises a groove 640 which in the locked position is in engagement with a circumferential protrusion 51 on the centrifugal chamber 5 such that the centrifugal chamber 5 is axially held in position.

In the schematic sectional view according to FIG. 1 only a single locking roller 64 is shown which is associated with a locking excenter 63 and an actuating wheel 61. However, on the rotor 3, as shown in FIG. 2, altogether three locking rollers 64, 65, 66 are arranged in an equally spaced manner about the rotational axis D1. Of such locking rollers 64, 65, 66, only the locking roller 64 is adjustable in its position and accordingly is arranged on an associated locking excenter 63. The remaining looking rollers 65, 66 are rotatable with respect to the rotor 3 about associated rotational axes D5, D6, but are not adjustable in the positions of their rotational axes D5, D6 and hence are arranged on the rotor 3 in a locationally fixed manner.

In principle, it however is also possible that all locking rollers 64, 65, 66 can be adjusted in the positions of their rotational axis D4, D5, D6. In this case, each locking roller 64, 65, 66 is associated with a locking excenter 63 which is coupled with an actuating wheel 61 and via the actuating wheel 61 with the gearing wheel 60.

During normal operation of the centrifuge device 1, the locking rollers 64, 65, 66 rotate together with the rotor 3 with the rotational speed V1 about the rotational axis D1. Because the centrifugal chamber 5 rotates with a rotational speed V2 twice the rotational speed V1 of the rotor, the locking rollers 64, 65, 66 roll along the circumferential protrusion 51 of the centrifugal chamber 5 and are rotated about the associated rotational axes D4, D5, D6, while the locking engagement of the protrusion 51 with the locking rollers 64, 65, 66 is maintained.

The locking device 6 can assume a locked state (shown in FIG. 1) and an unlocked state. In the locked state the locking roller 64 via its groove 640 is in engagement with the circumferential protrusion 51 of the centrifugal chamber 5. Equally, the remaining, non-adjustable locking rollers 65, 66 via corresponding grooves are in engagement with the protrusion 51 such that the centrifugal chamber 5 is axially fixed to the rotor 3. In the unlocked state, in contrast, the adjustable locking roller 64 is radially removed from the protrusion 51 such that the protrusion 51 no longer engages the groove 640 of the adjustable locking roller 64. The centrifugal chamber 5 hence can be removed from the rotor 3 by axially lifting it from the rotor 3.

The actuation of the locking excenter 63 of the adjustable locking roller 64 takes place via the actuating wheel 61. In a normal state of operation, in which the rotor 3 is driven via the locking device 6, the locking device 6 is in its locked position in which the centrifugal chamber 5 is axially fixed. If the locking device 6 shall be unlocked, the rotor 3 is stopped and, by reverting the rotational direction of the drive device 7 and driving the drive shaft 70 in an opposite rotational direction A2 (see FIG. 1), the actuating wheel 61 is pivoted about its associated rotational axis D4 such that via the associated locking excenter 63 the locking roller 64 is moved and brought out of engagement from the circumferential protrusion 51 of the centrifugal chamber 5.

The driving of the rotor 3 and the actuating of the locking device 6 hence take place by using the same drive device 7 which in dependence on its rotational direction A1, A2 either drives the rotor 3 or moves the actuating wheel 61, during stand still of the rotor 3, relative to the rotor 3 and in this way actuates the locking device 6.

For carrying the rotor 3 along the actuating wheel 61 for example can abut a stop on the rotor 3 once the locked position of the locking device 6 is reached and the locking element 64 is in engagement with the protrusion 51 of the centrifugal chamber 5. However, it also is conceivable that only by means of the abutment of the locking element 64 on the centrifugal chamber 5, due to which the actuating wheel 61 cannot be moved further relative to the rotor 3, the rotor 3 is carried along when turning the drive shaft 70 in the rotational direction A1.

An adjustment lever 67 is arranged on the shaft 62 of the actuating wheel 61 and can be actuated manually for manually moving the locking excenter 63 and the locking roller 64 arranged thereon. In this way, the locking device 6 can manually be brought into its unlocked position in order to unlock the centrifugal chamber 5 to be able to remove it from the rotor 3. Likewise, the locking device 6 can, after inserting the centrifugal chamber 5 into the centrifuge device 1, also be locked again manually.

The locking device 6 preferably is bi-stable in that the locked position and the unlocked position each are stable. The locking excenter 63 hence with the locking roller 64 arranged thereon remains in the locked position or the unlocked position if it has been moved into the locked position or the unlocked position, respectively. In particular, in this way it is not necessary to energize the drive device 7 to hold the locking excenter 63 in the unlocked position. The locking excenter 63 rather remains in the unlocked position after unlocking the locking device 6 and stays in the position it has assumed until it actively is moved out of the unlocked position.

In order to ensure that, during unlocking or during locking, the rotor 3 is not moved along with the actuating wheel 61, for example due to friction forces acting between the actuating wheel 61 and the rotor 3, a brake device 30 in the shape of a magnetic brake is provided which comprises at least one magnet which is arranged opposite to an associated magnet arrangement on the rotor 3 in a magnetically attracting fashion such that the rotor 3 by means of a predefined holding force is held in its currently assumed position. By means of the brake device 30, whose holding forces are dimensioned such that for example friction forces of the actuating wheel 61 cannot lead to a movement of the rotor 3, it is ensured that the rotor 3 is held in its position when the locking device 6 is unlocked by rotating the drive shaft 70 in the rotational direction A2 such that the actuating wheel 61 can be moved relative to the rotor 3. Vice versa, also when adjusting the locking device 6 from its unlocked position into the locked position, the rotor 3 is held in position until the locked position is reached and the locking roller 64 hence has come into abutment with the centrifugal chamber 5. Only then the rotor 3, when further rotating the drive shaft 70 in the rotational direction A1, is carried along and hence is rotated for driving the centrifugal chamber 5.

The idea underlying the invention is not limited to the embodiments described above, but rather can be realized also in entirely different embodiments.

By means of the centrifuge device as described herein, a device is provided having a compact structural built which can be operated in a silent manner. Because only a comparatively small number of parts for driving the centrifugal chamber and for actuating the locking device is required, the overall costs of the centrifuge device may be reduced. Because the locking device and the rotor are driven by a single drive device, an additional drive device—which otherwise would be necessary for actuating the locking device—becomes dispensable.

If the locking device comprises bi-stable positions and if it in addition can be manually actuated, for example an additional battery for an emergency operation in case of a power-outage is not required because an unlocking of the locking device is possible also without availability of electric power.

LIST OF REFERENCE NUMERALS

1 Centrifuge device
2 Housing
3 Rotor
30 Brake device
35 Guide device
4 Drive chain
40 Shaft
41 Coupling wheel
42 Drive wheel
43 Belt
44 Gearing wheel
5 Centrifugal chamber
50 Gearing wheel
500 Toothing
51 Circumferential protrusion
6 Locking device
60 Gearing wheel
61 Actuating element (actuating wheel)
62 Shaft
63 Locking excenter
64 Locking element (locking roller)
640 Groove
65, 66 Locking element (locking roller)
67 Adjustment lever
7 Drive device (motor)
70 Drive shaft
8 Tube
80, 81 End
9 Port
A1, A2 Rotational direction
D1, D2, D3, D4, D4', D5, D6 Rotational axis
V1, V2 Rotational speed

The invention claimed is:
1. A centrifuge device, comprising:
a fixed section,
a drive device having a drive shaft,
a rotor mounted rotatably on the fixed section about a first rotational axis, the rotor being drivable, by means of the drive device, about the first rotational axis,
a transfer shaft which is mounted on the rotor rotatably about a second rotational axis which is eccentric to the first rotational axis, the transfer shaft being coupled via a gearing with the fixed section such that the transfer shaft is rotated about the second rotational axis relative to the rotor during a rotational movement of the rotor, a centrifugal chamber rotatable about a third rotational axis, the centrifugal chamber being operatively connected to the transfer shaft such that the centrifugal chamber is rotated during a rotational movement of the transfer shaft, and a locking device arranged on the rotor for axially fixing the centrifugal chamber on the rotor, wherein the locking device comprises a locking element and an actuating element for adjusting the locking element, the locking element being adjustable between a locked position in which the centrifugal chamber is axially fixed with respect to the rotor and an unlocked position in which the centrifugal chamber is removable from the rotor, wherein the drive device is operatively connected with the actuating element such that the drive device, when rotating the drive shaft in a first rotational direction about the first rotational axis, drives the rotor via the actuating element and, when rotating the drive shaft in a second rotational direction opposite to the first rotational direction, the actuating element is moved relative to the rotor, wherein the transfer shaft carries a coupling wheel which via the gearing is coupled with the fixed section, wherein the gearing is constituted as a belt gearing and comprises a belt via which the coupling wheel is operatively connected with a gearing wheel fixedly arranged on the fixed section, and wherein the gearing wheel is arranged concentrically to the first rotational axis and extends about the drive shaft.

2. The centrifuge device according to claim 1, wherein the rotor, in operation of the centrifuge device, rotates with a first rotational speed and the centrifugal chamber rotates with a second rotational speed twice the first rotational speed.

3. The centrifuge device according to claim 2, wherein the transfer shaft carries a drive wheel and is coupled via the drive wheel with a gearing wheel of the centrifugal chamber.

4. The centrifuge device according to claim 2, wherein the third rotational axis and the first rotational axis are co-linear with respect to each other.

5. The centrifuge device according to claim 1, wherein the transfer shaft carries a drive wheel and is coupled via the drive wheel with a gearing wheel of the centrifugal chamber.

6. The centrifuge device according to claim 1, wherein the belt is constituted as a toothed belt and is in toothed engagement with the coupling wheel and the gearing wheel.

7. The centrifuge device according to claim 1, the third rotational axis and the first rotational axis are co-linear with respect to each other.

8. The centrifuge device according to claim 1, wherein the actuating element is pivotably arranged in the rotor about a fourth rotational axis and is coupled with a locking excenter connected to the locking element such that the locking element is adjustable between the locked position and the unlocked position by pivoting the actuating element about the fourth rotational axis.

9. The centrifuge device according to claim 8, wherein the locking element is constituted as a locking roller rotatably arranged on the locking excenter, the locking roller in the locked position engaging the centrifugal chamber in a locking fashion and in the unlocked position being out of engagement with the centrifugal chamber.

10. The centrifuge device according to claim 1, wherein the locking element is held in the locked position and the unlocked position in a stable fashion.

11. The centrifuge device according to claim 1, wherein the locking device further comprises a locking element not being adjustable in its position.

12. A centrifuge device, comprising:

a fixed section, a drive device having a drive shaft, a rotor mounted rotatably on the fixed section about a first rotational axis, the rotor being drivable, by means of the drive device, about the first rotational axis, a transfer shaft which is mounted on the rotor rotatably about a second rotational axis which is eccentric to the first rotational axis, the transfer shaft being coupled via a gearing with the fixed section such that the transfer shaft is rotated about the second rotational axis relative to the rotor during a rotational movement of the rotor, a centrifugal chamber rotatable about a third rotational axis, the centrifugal chamber being operatively connected to the transfer shaft such that the centrifugal chamber is rotated during a rotational movement of the transfer shaft, and a locking device arranged on the rotor for axially fixing the centrifugal chamber on the rotor, wherein the locking device comprises a locking element and an actuating element for adjusting the locking element, the locking element being adjustable between a locked position in which the centrifugal chamber is axially fixed with respect to the rotor and an unlocked position in which the centrifugal chamber is removable from the rotor, wherein the drive device is operatively connected with the actuating element such that the drive device, when rotating the drive shaft in a first rotational direction about the first rotational axis, drives the rotor via the actuating element and, when rotating the drive shaft in a second rotational direction opposite to the first rotational direction, the actuating element is moved relative to the rotor, wherein a brake device for braking the rotor during an adjustment movement of the actuating element relative to the rotor, wherein the brake device is constituted as a magnetic brake for magnetically braking the rotor.

13. A method for operating a centrifuge device, the centrifuge device comprising:

a fixed section, a drive device having a drive shaft, a rotor mounted rotatably on the fixed section about a first rotational axis, wherein the rotor is driven, by means of the drive device, about the first rotational axis, a transfer shaft which is mounted on the rotor rotatably about a second rotational axis which is eccentric to the first rotational axis, the transfer shaft being coupled via a gearing with the fixed section such that the transfer shaft is rotated about the second rotational axis relative to the rotor during a rotational movement of the rotor, a centrifugal chamber rotatable about a third rotational axis, the centrifugal chamber being operatively connected to the transfer shaft such that the centrifugal chamber is rotated during a rotational movement of the transfer shaft, and a locking device arranged on the rotor for axially fixing the centrifugal chamber on the rotor, wherein the locking device comprises a locking element and an actuating element for adjusting the locking element, the locking element being adjustable between a locked position in which the centrifugal chamber is axially fixed with respect to the rotor and an unlocked position in which the centrifugal chamber is removable from the rotor, wherein the drive device is operatively connected with the actuating element, wherein the drive device, when rotating the drive shaft in a first rotational direction about the first rotational axis, drives the rotor via the actuating element and, when rotating the drive shaft in a second rotational direction opposite to the first rotational direction, moves the actuating element relative to the rotor.

* * * * *